July 28, 1931. A. MOORE 1,816,440
EXTERNALLY SOLDERED CAN CLOSURE AND PROCESS OF MAKING SAME
Filed Feb. 20, 1923 2 Sheets-Sheet 1
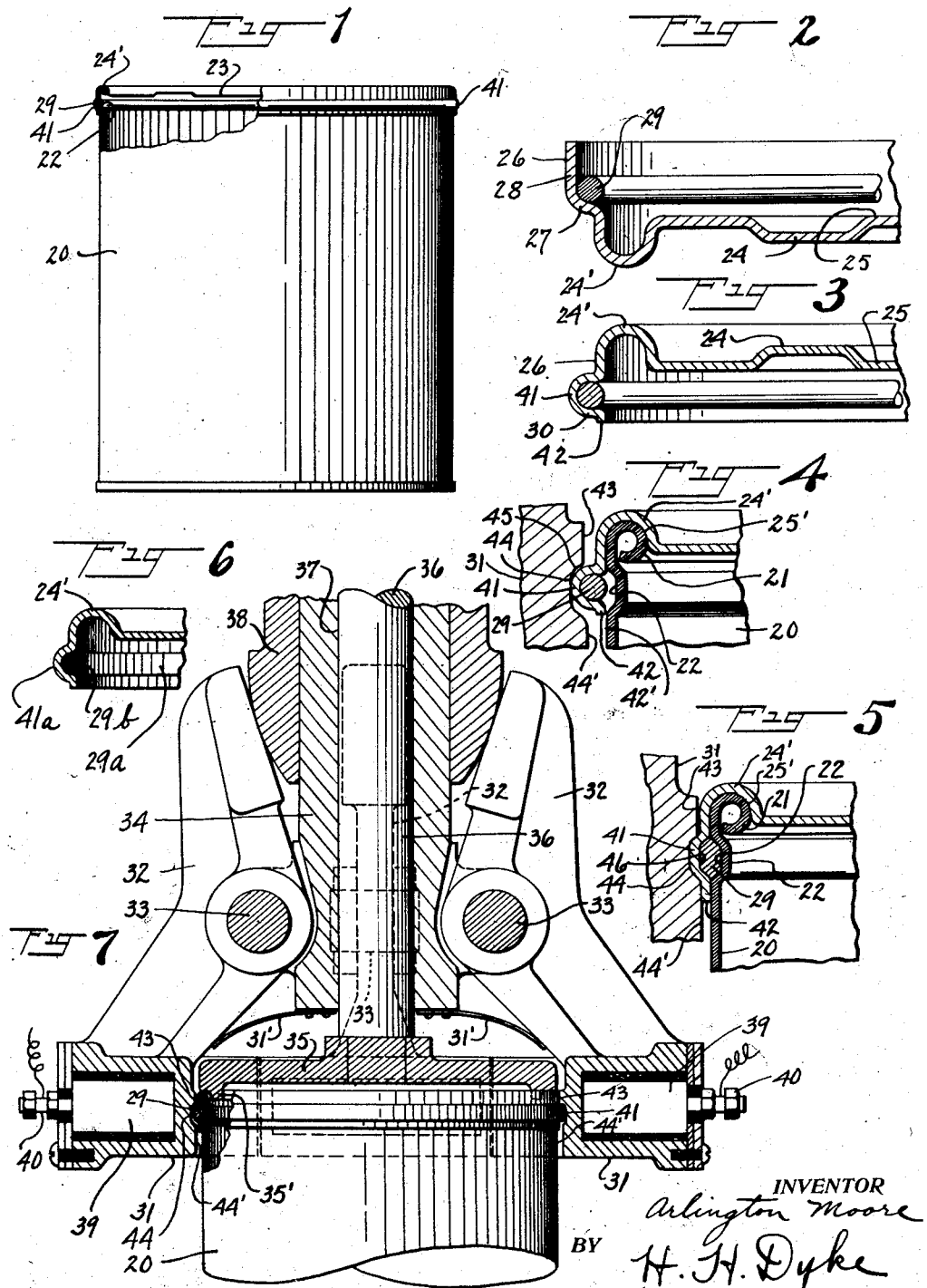
INVENTOR
Arlington Moore
BY H. H. Dyke
ATTORNEY

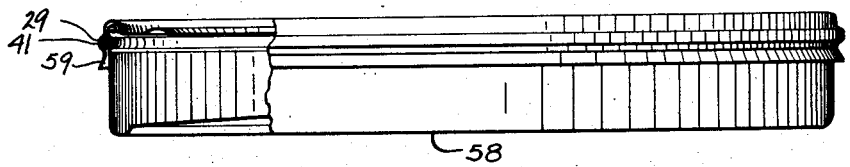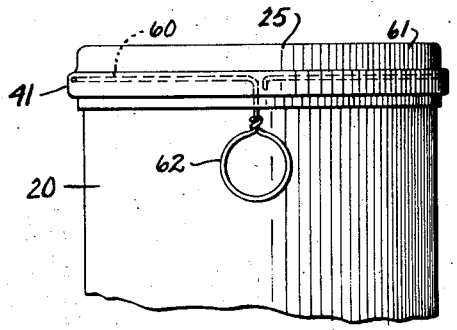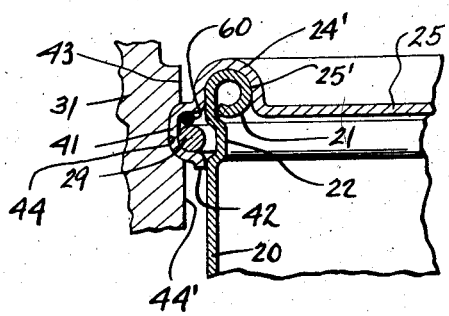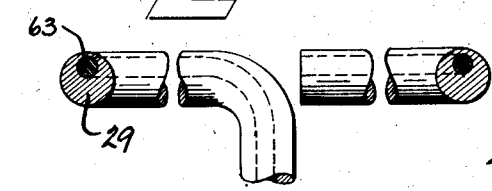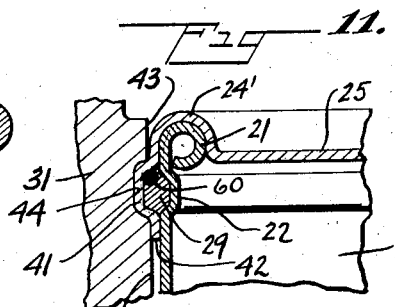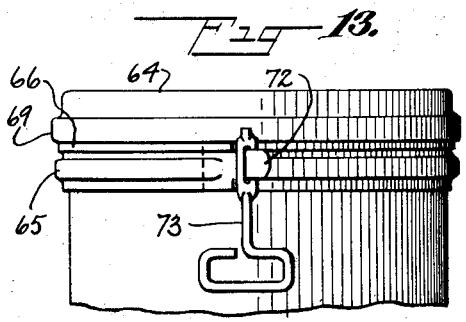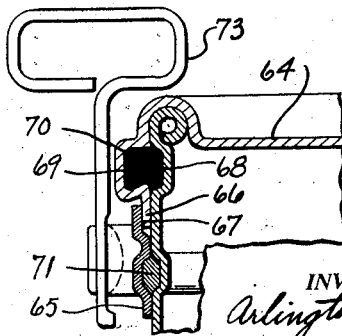

Patented July 28, 1931

1,816,440

UNITED STATES PATENT OFFICE

ARLINGTON MOORE, OF WORCESTER, MASSACHUSETTS, ASSIGNOR TO MOORE INVENTIONS CORPORATION, OF WORCESTER, MASSACHUSETTS, A CORPORATION OF MASSACHUSETTS

EXTERNALLY SOLDERED CAN CLOSURE AND PROCESS OF MAKING SAME

Application filed February 20, 1923. Serial No. 620,133.

My invention relates to an externally soldered sanitary can closure and process of making same. With the can closure of the present invention the lid has solder, preferably in the form of a ring of solder wire, securely attached at the time of manufacture to the inner side of the lid flange at or toward the edge thereof furthest from the flat or cover portion of the lid.

According to one form of the invention a ring of solder is dropped or laid into a recess formed in the lid flange and the solder ring secured in place by spinning the edge of the lid flange inwardly to provide a groove in which the solder is securely held by the material of the lid.

The can bodies and the lids, with the solder for forming an externally soldered seal secured thereto, are shipped as usual, and the packer completes the externally soldered closure when the goods are packed.

The invention also relates to a novel process for effecting the externally soldered can closure, comprising the steps of compressing the lid flange with solder therein on the can body, applying heat while the parts are compressed to form the soldered joint, and finally removing the pressure when the solder has cooled and set, together with other related steps as will be set forth.

Other objects will appear in connection with the following description, and with the foregoing and related objects in view my invention consists in the combinations and processes herein set forth and claimed.

Fig. 1 is a part side and part sectional view of a completed sanitary can embodying my invention.

Fig. 2 is a central sectional view of the can lid, in the first stage of construction with its edges flanged up, but not turned inwardly, and with a ring of solder dropped or laid therein preparatory to being secured therein by spinning over the margin of the lid flange.

Fig. 3 is a view similar to Fig. 2, but with the lid flange spun or turned inwardly to secure the solder ring in place.

Fig. 4 is a sectional view showing the relation of the lid to the can when first put in place thereon.

Fig. 5 is a view similar to Fig. 4 and showing the lid flange pressed inwardly against the can body and the solder joint completed.

Fig. 6 is a view similar to Fig. 3, but showing the solder wire compressed and flattened and requiring less compression of the lid flange than with the form of Fig. 2.

Fig. 7 is a central vertical sectional view of a preferred form of lid flange compressing and soldering apparatus.

Fig. 8 is a part side and part sectional view of a flat can, such as a sardine can, and having a modified form of lid flange, including an outwardly projecting skirt portion which serves to facilitate breaking of the soldered seal and the opening of the can.

Figs. 9, 10 and 11 illustrate a modification in which a steel wire or the like is included in the soldered joint and when pulled out serves to break the soldered joint and permit removal of the can lid.

Fig. 9 is a side view of a can with a steel ring provided within the soldered joint and having a projecting hand-hold of ring form.

Fig. 10 is a cross-sectional view similar to Fig. 4, but showing, in addition to what is shown in Fig. 4, a ring of steel wire included with the solder for the purpose of forming an opening device.

Fig. 11 is a view similar to Fig. 5 and showing the relation of the opening ring to the completely soldered joint.

Fig. 12 illustrates a modification in which the solder wire has the steel wire for opening embedded or molded therein in the course of its manufacture.

Figs. 13 and 14 are respectively side and cross-sectional views of a further modification in which the can lid is hermetically sealed to the can body by a gasket of rubber or the like and has a separate ring soldered thereto, which in turn is secured to the can body by a soldered joint, and illustrating the use of an opening key for removing such soldered ring.

The can body 20 of Fig. 1 may be of any form or construction. Preferably the upper margin thereof is turned inwardly as shown at 26, Fig. 3, to provide a rounded edge and a shallow marginal recess 22 is provided on the exterior of the can body adjacent to its upper end, that is to say, the end which receives the lid.

The lid 23 is preferably stamped from a disk of suitable size and the flat or cover portion thereof is formed in any suitable way to permit maximum flexure. In the form shown an annulus 24 is pressed outwardly near the margin of the lid, thus providing for diaphragm action of the central portion 25 when the closed can is subjected to inward or outward pressure and enabling it to yield to the necessary extent.

The lid 23 is provided with a marginal portion 24' turned on a radius and adapted to fit closely over the rounded part 21 at the end of the can body, the inner diameter of the can lid being such that when the lid is put in place and forced on it will fit or bind close and tight about the inner margin of the can body at the region indicated by reference character 25', Fig. 4, thus serving to keep any of the contents of the can from getting past this point or region and interfering with the proper formation of the solder joint. The side flange of the can lid, indicated generally by reference character 26, includes an outwardly turned portion 27 and a relatively straight flange portion 28, the outwardly turned portion 27 forming on its interior a seat for a ring of solder 29, which is preferably dropped into the can lid and then secured in place by spinning the edge of the flange portion 28 inwardly as shown at 30, Fig. 3, so as to secure the solder ring 29 in place therein.

The can bodies and the lids having the solder ring fastened in place therein in the manner just described are shipped in the usual way to the packer, who, after filling the cans, secures the lids in place thereon in the manner to be described. It is to be noted that the can bodies are not flanged outwardly at their upper ends as is customary with sanitary cans as heretofore constructed, and the cans when packed in their cases are not spread or spaced apart by any such projecting margin, so that the cans after being packed can be replaced in the same case and will fit snugly therein, and the dimensions of the case for cans of the same body diameter can be somewhat smaller than is possible with the flanged can bodies.

The packer is provided with suitable apparatus for securing the can lids in place and for completing the solder joint, and the solder, being secured in place in the can lids at the time of manufacture, is in place and ready for use when the step of soldering the lids in place is to be performed.

The apparatus preferably used for this purpose comprises means for pressing the lid flanges inwardly and also means for applying the necessary heat for melting the solder to make the solder joint. Such apparatus may comprise a plurality of heating and compressing members, preferably four, of arcuate form as illustrated at 31, 31, Fig. 7, which are mounted for inward and outward movement, as, for example, upon the lever arms 32, 32 pivoted at 33, 33 to a suitable support such as the tubular supporting member 34. The closing apparatus also preferably has means for pushing the lid in place and same may comprise a push block or disk 35 carried by the cylindrical bar 36 passing through bore 37 of the tubular support 34. Disk 35 is preferably provided with a downwardly extending rib 35', which enters the recessed part of the can lid and serves to hold the lid margin and can body outward when pressure is applied to the lid flange. The compression and soldering member 31 may be pressed inwardly by any suitable means, such for example as collar 38 sliding on the tubular support 34, and such soldering and compression members 31 may be heated in any desired way, as, for example, by means of the inserted electrical heating elements 39, 39 having suitable electrical connections as illustrated at 40, 40. Means, such as springs 31' are provided to move the members 31 apart when released as by upward movement of the collar 38. The current may be turned off and on to secure alternate heating and cooling of the compression members 31 or such effect may be secured in other ways, so long as heat is applied during the making of the soldered joint and the pressure applied thereto is maintained until same is cooled and set, after which the pressure is released.

The pressure applying devices are of such form that the bead portion 41 of the lid flange containing the solder ring 29 is pressed inwardly and is at the same time held against upward movement, whereas the edge 42 of the flange 28 of the can lid is left free to move downwardly as the application of pressure continues. In the form shown, this result is secured by providing the pressing member 31 with a narrow projecting portion 43 at such a height that it comes just above the bead portion 41 of the can lid and serves to maintain same against moving upwardly. Below the projecting portion 43, the pressure members 31 are recessed or cut backwards somewhat as indicated at 44 and the portions 43 and 44 are joined in a rounded corner or fillet 45. Still further down the pressure member may project outwardly again as indicated at 44'. Recess 44 is wider than the initial height of bead 41, as shown in Fig. 4. When pressure is applied by pressure members constructed as described, the resulting formation of the can lid flange is indicated in Fig. 5 and it is to be particularly noted that the edge 42 of the can lid flange is pushed inwardly and downwardly along the side of the can body 20 and scrapes downward therealong over a band of substantial width in the neighborhood indicated by reference character 42', thus serving to assist in preparing the surface for securing firm adhesion of the solder as the same is melted and fills the space between the walls of the recess 22 in the can body and the walls of the corresponding recess 46 in the lid flange and also extending for a greater or less distance between the two adjacent surfaces of can body and can lid, as will be understood. Should it happen that the can body has small dents therein, the lid margin 42 being pressed inwardly will follow the indentations and keep in close contact therewith, thus making a close conformation of the edge of the can lid to the can body and securing a tight soldered joint, although there may be slight dents or depressions in the can body. A similar result takes place in the region occupied by the seam of the can body, which, for example, may be a lock seam. Portion 44' of the pressure member comes into contact with the edge portion 42 of the can lid at the close of the pressure stroke and serves as a stop and also serves to hold the margin of the lid flange securely against the can body.

The compression of the parts in the manner described effectually prevents any running out of the solder from the seam during its formation. The solder is preferably of the type which carries its own flux, so that a tight soldered joint is obtained without separate application of soldering fluid. The formation of the opposing recesses 22 and 46 in the can body and lid preferably are such that a substantial thickness of solder is had in the finished joint and the difficulties which might be encountered in attempting to solder together two flat surfaces with a thin film of solder therebetween are avoided.

If desired, the groove in the lid flange may be made shallow, as shown at 41a, in Fig. 6, and the solder 29a may be rolled or pressed into place, being flattened out as shown at 29b. The final joint produced is practically the same as in Fig. 4, but less compression of the lid flange suffices to secure this result.

The lid secured in place as described may be removed in various ways, it being relatively easy to remove the lid by stripping it off at the soldered joint once the joint has been broken. A tool may be provided for this purpose and may have a sharp point adapted to puncture or dent the lid and locate the tool with respect thereto and a sharp upwardly pointed hook which may take under the edge of the lid or under the bead 41, and when pulled upwardly sharply while the can is held will readily break the solder of the joint, permitting the lid to be readily lifted or stripped off.

In Fig. 8 I have shown the application of a sanitary seal in accordance with my invention applied to a sardine can, comprising a one-piece can body 58. The lid in this case is provided with a downwardly and outwardly projecting skirt portion 59 which facilitates removal of the lid, and in the absence of a tool specially designed for the purpose, the solder seal can be broken by use of almost any convenient tool or piece of metal applied under the projecting skirt 59.

The modification of Figs. 9, 10 and 11 consists in the provision with the solder in the joint of a wire 60 made preferably of steel, and which is preferably located between the solder joint and the end of the can, and the end of the wire is preferably brought down and out from under the edge of the lid 61, as indicated in Fig. 9 and there provided with any convenient holding or grasping means, such as by being twisted into a ring 62. The wire ring 60 becomes embedded in the solder joint when same is formed, as shown in Fig. 11. The modification of Fig. 12 shows a composite wire and solder structure comprising a wire of steel or the like 63 initially located within the body of the solder and with this exception the same effect is secured as with the separate wire ring as illustrated in Fig. 11. The breaking of the joint in the modification of Figs. 9–11 is obtained by the application of force manually or otherwise to the projecting end of the sealed in wire insert, as will be readily understood.

It is not essential in all cases that the lid be a one-piece lid as illustrated in the figures heretofore described. For example, the lid 64 shown in Fig. 14 is made in two pieces and has a ring 65 soldered to the lid flange 66 as indicated at 67 (the solder used for this purpose preferably has a higher melting point than the solder for ultimately securing the ring to the can body).

The can body in this instance is provided with two recesses, one indicated at 68 coming opposite a recess 69 in the flange 66 and a compression sealing gasket 70, secured in place in the recess 69 as by pinching the sides of the recessed part together with the gasket 70 of rubber or the like therebetween, which forms a hermetic seal and locks the lid in place by expanding into recess 68 in the can body when the lid is manually pushed into place on the can body. The securing of the ring part 65 of the lid 64 to the can body is done by the packer as already described, the solder joint produced being indicated by reference character 71.

Provision is made for stripping off the soldered ring 71, and while a variety of means may be used for this purpose, in the form shown ring part 65 has an extension or tongue 72 adapted to take the customary key 73, which when reversed from the position shown in Fig. 13 to that shown in Fig 14, may be turned to strip off the ring 65 or at least to initially free a part of the ring from the flange 66 of the can lid and also from the can body, after which it can be pulled off without the necessity of resorting to the slow and laborious working of the key entirely around the can body, though this may be done if desired.

The specific form shown in Figs. 13 and 14 is not claimed specifically herein, being the subject matter of a separate application for patent, but is illustrated to show that the invention is not confined to a one piece lid.

It will be seen that can closures embodying the present invention have numerous features of advantage and in particular the external soldered joint is made adjacent to the margin of the can lid and at the furthest possible distance from the can contents, which are prevented from getting into the neighborhood of the solder by the close fit of the lid at the region 25' above referred to, the soldered seal is made at least in part on clean, freshly scraped surfaces, and being accompanied by compression of the can lid flange results in an absolute and complete hermetic seal being obtained. If the can is of the lock and lap type the location of the solder joint is such that it may extend down beyond the lap portion and any chance of the can opening up at the lapped part is avoided. Absolute certainty is secured in making a hermetic tight joint with substantially no possibility of leakage as frequently occurs with the familiar type of sanitary can having a double seamed closure with an intervening gasket of paper or the like. Ample provision is made in the form of the lid to accommodate the can to various conditions of temperature and pressure during processing of foodstuffs, so there is no danger of bulging or contracting of the can having any effect upon the closure as may occur with the gasketed joints of the ordinary double seamed sanitary can closure.

It is to be understood that the embodiments which are shown are for the purpose of illustration only and are not for limitation of the invention, and that modifications and changes may be resorted to within the scope of my claims by which the invention is defined.

I claim:

1. A container comprising a hollow body portion open at the end thereof and having the edge thereof about said opening turned to form a bead, a closure over the open end of said body portion having a recess therein receiving said bead; and a portion extending from said closure and disposed about and engaging the exterior of the upper end of said body portion; said last-named portion and the contiguous body portion forming a recess therebetween, and a sealing material disposed within said recess.

2. In a sheet metal can of the simple soldered on, flanged lid type, the combination of a can body having its lid receiving end inturned and a recess in its outer wall in the lid end thereof, a lid provided with a flange adapted to extend longitudinally over the can body past the said recess, and said lid flange having a recess on its inner wall substantially close to the edge of the flange and which is located substantially opposite the recess in the can body when the lid is in place with its cover portion in contact with the inturned end of the body, and a joint of solder between the lid flange and the can body and substantially filling the cavity provided between said opposing recesses.

3. The process of sealing a can of the simple soldered on, flanged lid type, which comprises applying to the can body a flanged lid having a ring of solder secured in the interior surface of the flange, compressing the flange on the can body and thereby scraping the edge of the flange along the can body, and applying heat to melt the solder and bring it intimately into contact with the scraped portion of the can body.

4. The herein described process which consists in taking a hollow body portion and a closure therefor having an annular portion extending therefrom, disposing said closure over the end of said body portion with said annular portion disposed about the exterior thereof and with fusible sealing material interposed therebetween, applying pressure to said annular portion to move the upper and lower parts thereof into close contact with the exterior surface of said body portion, and simultaneously therewith subjecting the same to the action of heat for hermetically sealing the contiguous surfaces of the intermediate part of said annular portion and said body portion to provide a fluid tight joint therebetween.

In testimony whereof, I have signed my name hereto.

ARLINGTON MOORE.